Oct. 21, 1930.    A. W. WOODWARD    1,779,386
LATCHING DEVICE
Filed May 10, 1928
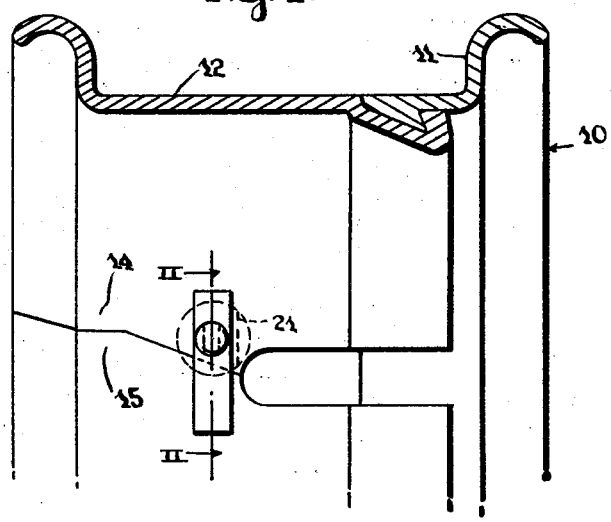
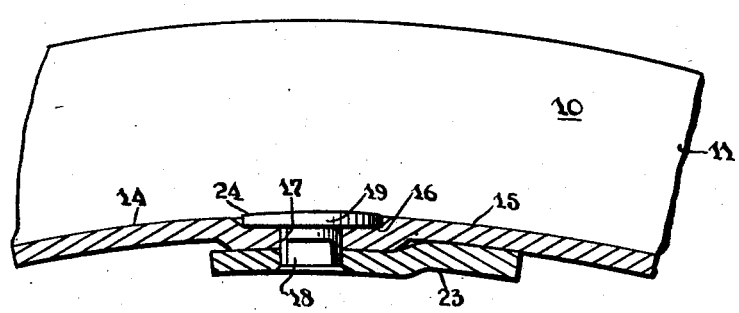
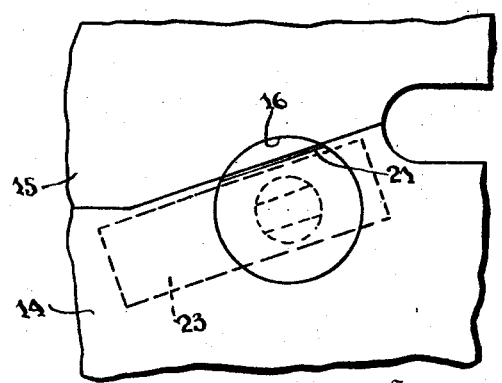
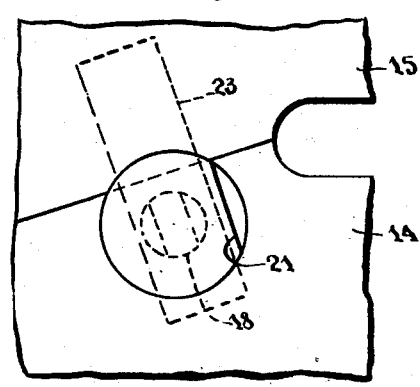
Inventor
Alva W. Woodward.
By
Attorney Patented Oct. 21, 1930

1,779,386

UNITED STATES PATENT OFFICE

ALVA W. WOODWARD, OF AKRON, OHIO, ASSIGNOR TO THE GOODYEAR TIRE & RUBBER COMPANY, OF AKRON, OHIO, A CORPORATION OF OHIO

LATCHING DEVICE

Application filed May 10, 1928. Serial No. 276,573.

This invention relates to demountable rims for vehicle wheels and it has particular relation to a transversely split rim having a latching device for maintaining the ends of the rim member bordering the split in circumferential alignment.

An object of the invention is to provide an improved releasable latching device for a rim member of the type referred to, which is adapted to contact with the ends of the rim member adjacent the split and maintain these ends substantially in abutting and aligned relation.

When employing a split annular tire supporting rim, it is desirable that a latching device be employed to assist in so maintaining the ends of the rim in alignment, that the outer periphery of the rim will present a continuous smooth surface for supporting a tire. It is also desirable that such a device be of simple construction, and easy to operate. While latching devices for rims have been provided heretofore, usually they have not been entirely satisfactory, either because they were of expensive construction or because they were not sufficiently positive in operation. Frequently such latching devices would be moved accidentally from their operative positions, thus permitting the ends thereof to become disengaged and to move relatively with respect to each other. In many instances, considerable damage to a tire resulted from this cause.

This invention comprises a latching device for rims of the type referred to, which is simple and inexpensive in construction, easy to manipulate, and positive in operation. Essentially, it comprises a pair of members, one on each peripheral surface of the rim adjacent the split therein, which are connected together by a rotatable pin passing through the rim. In their operative positions, these members engage both the inner and outer peripheral surfaces of the ends of the rim adjacent the split, whereas in inoperative position, they are entirely disengaged from one of the ends of the rim member, thus permitting the ends to move relatively.

For a better understanding of the invention, reference may now be had to the accompanying drawings, forming a part of the specification, of which:

Figure 1 is a fragmentary plan view of a rim provided with a locking device embodying the features of the invention, the rim being shown in cross-section by a portion of the figure;

Figure 2 is a fragmentary longitudinal sectional view of the rim, taken substantially along the line II—II of Figure 1;

Figure 3 is a fragmentary plan view of the rim, on a larger scale, showing the locking device in its inoperative position; and Figure 4 is a fragmentary plan view of the portion of the rim illustrated by Figure 3, showing the locking device in its operative position.

Referring to Figure 1, a rim 10 comprises an endless member 11, which is disposed in interlocking relation with respect to a transversely split annular member 12, having end portions 14 and 15. A greater portion of a circularly formed depression 16 is disposed in the upper surface of the member 12, adjacent the end portion 14 thereof, while the remaining portion of the depression is disposed oppositely thereto within the end 15 of the member. Centrally with respect to the depression 15, the end 14 of the rim is provided with a radially extending opening 17 for receiving a rotatable pin 18, that is formed integrally with a plate 19 disposed in the depression 16. A portion of the plate 19, corresponding to the portion of the depression 16 which is formed within the end portion 15, is cut away, in order to provide a straight edge 21. As best shown by Figure 3, when the plate 19 is in its inoperative position, the edge 21 coincides with the split in the member 12, thus permitting the ends of the member to be moved relatively. However, by rotating the pin 18, a portion of the plate 19 will be moved across the split 13, and into engagement with the upper surface of the depression in the end 15 of the member, thus preventing outward radial movement of the end 15 with respect to the end 14. With the plate 19 in this position, its edge is engaged by the edge of the depression, and hence relative lateral movement of the ends of the member also is prevented.

On the inner surface of the pin 18 is secured an elongate arm 23, which is slightly curved longitudinally, to conform to the curvature of the rim. This arm serves as a means for rotating the pin 18 and plate 19, to prevent downward movement of the end 15 of the member relative to the end 16, and normally to hold the locking device in position.

In order more securely to maintain the latching device in its operative position, the plate 19 is so extended above the outer peripheral surface of the rim, as indicated at 24, that the pressure of an inflated inner tube in a tire mounted upon the rim, normally serves to prevent its rotation.

From the foregoing description, it will be apparent that the invention embraces a simple and inexpensive latching device for rims of the type described. Also, it will be apparent that the latching device, when in its operative position, prevents both radial and lateral movements of the ends of the rim.

Although I have illustrated only one form which the invention may assume and have described in detail only a single application thereof, it will be apparent to those skilled in the art that the invention is not so limited, but that various minor modifications may be made therein without departing from the spirit of the invention or from the scope of the appended claims.

What I claim is:

1. A latching device for maintaining in operative position the ends of a transversely split rim member comprising a plate pivoted to one end of the member and having a portion thereof adapted to be turned into engagement with the other end of the member, the pivot for the plate extending through the member and having an arm fixed thereto, the arm being adapted also to engage the other end of the member, said plate being positioned in a depressed portion of the member and rotatable into a corresponding depression in the other end of the member.

2. In combination with a substantially annular pneumatic tire supporting rim having a transversely split base portion, the ends of the base portion having registering depressions in their outer surfaces, a plate movably secured to one end of the rim and normally disposed in the depressions, said plate having a greater thickness than the depth of the depressions.

3. In combination with a substantially annular pneumatic tire supporting rim having a transversely split base portion, the ends of the base portion having registering depressions in their outer surface, a plate pivotally secured to one end of the rim and normally disposed in the depressions, said plate having a greater thickness than the depth of the depressions.

4. In combination with a substantially annular pneumatic tire supporting rim having a transversely split base portion, the ends of the base portion having registering depressions in their outer surfaces, a plate normally disposed in such depressions and having a pin projecting through one end of the rim, and an operating arm secured to the other end of the pin.

5. In combination with a substantially annular pneumatic tire supporting rim having a transversely split base portion, the ends of the base portion having registering depressions in their outer surfaces, a plate normally disposed in such depressions and having a pin projecting through one end of the rim, and an operating arm secured to the other end of the pin, the plate having a thickness greater than the depth of the depression.

6. In combination with a substantially annular pneumatic tire-supporting rim having a transversely split base portion, the ends of the base portion having registering depressions in their outer surfaces, of a plate normally disposed in such depressions and having a pin projecting through one end of the rim, said pin having means on its inner end by means of which it and the plate may be turned about the axis of the pin.

In witness whereof, I have hereunto signed my name.

Signed at Akron, in the county of Summit and State of Ohio, this 9th day of May, 1928.

ALVA W. WOODWARD.